(12) United States Patent
Patton et al.

(10) Patent No.: US 8,873,736 B1
(45) Date of Patent: Oct. 28, 2014

(54) PROCESS FOR CAPTURING SITE MAINTENANCE AND REPAIR INFORMATION AND CREATING A CLOSEOUT PACKAGE IN NEAR REAL TIME

(71) Applicants: Catalyst Services USA LLC, Roswell, GA (US); OneVizion Technologies, Inc., Marietta, GA (US)

(72) Inventors: John Patton, Marietta, GA (US); J. Todd Smith, Roswell, GA (US); Alex Pero, Jr., Milton, GA (US); Randall J. Wilson, Duluth, GA (US); J. J. McCarthy, Alpharetta, GA (US)

(73) Assignees: Catalyst Services USA LLC, Roswell, GA (US); OneVizion Technologies, Inc., Marietta, GA (US)

( * ) Notice: Subject to any disclaimer, the term of this patent is extended or adjusted under 35 U.S.C. 154(b) by 0 days.

(21) Appl. No.: 14/308,144

(22) Filed: Jun. 18, 2014

Related U.S. Application Data

(60) Provisional application No. 61/836,908, filed on Jun. 19, 2013.

(51) Int. Cl.
*H04M 3/00* (2006.01)
*H04M 5/00* (2006.01)
*H04M 3/42* (2006.01)
*H04M 3/51* (2006.01)
*G06Q 10/00* (2012.01)

(52) U.S. Cl.
CPC ............. *H04M 3/5183* (2013.01); *G06Q 10/20* (2013.01)

USPC ............ 379/265.09; 379/201.03; 379/201.05; 379/265.05; 379/265.11; 379/265.12

(58) Field of Classification Search
USPC ............. 379/265.01, 265.09, 265.05, 265.11, 379/242, 265.02, 201.03, 201.04, 201.05, 379/201.01
See application file for complete search history.

(56) References Cited

U.S. PATENT DOCUMENTS 7,076,400 B2 * 7/2006 Dulberg et al. ............... 702/184
7,464,109 B2 * 12/2008 Modi ..................................... 1/1

* cited by examiner

*Primary Examiner* — Thjuan K Addy
(74) *Attorney, Agent, or Firm* — Molly D. McKay

(57) ABSTRACT

A process and system for capturing site maintenance and repair information and creating a closeout package in near real time. The process involves an on-site technician calling into a call center to establishing voice communication with the call center personnel. The personnel connect to the cloud to access photos that are to be taken by and automatically uploaded to the cloud using the technician's smart device. The technician then goes through a predetermined list of work items or actions while verbally describing to the call center personnel each item and while taking photos of key items. The call center personnel record in their computer item descriptions, information and photos in real time as the work is completed. Upon finishing the on-site work, the technician signs out and the call center personnel trigger the auto-generation of a closeout package that is immediately available to the customer via web access.

6 Claims, 1 Drawing Sheet

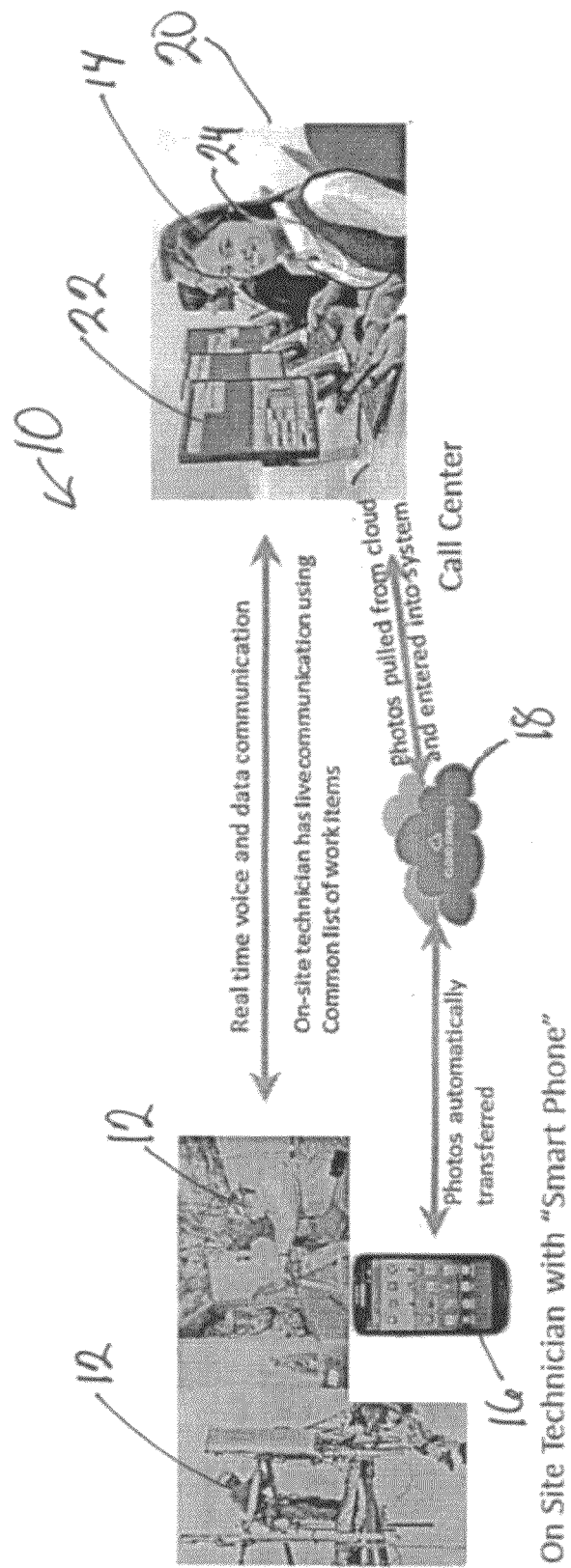

PROCESS FOR CAPTURING SITE MAINTENANCE AND REPAIR INFORMATION AND CREATING A CLOSEOUT PACKAGE IN NEAR REAL TIME

CROSS-REFERENCE TO RELATED APPLICATIONS

The present application claims priority to U.S. Provisional Patent Application No. 61/836,908 filed on Jun. 19, 2013 for Process for Capturing Site Maintenance and Repair Information and Creating a Closeout Package in Near Real Time.

BACKGROUND OF THE INVENTION

1. Field of the Invention

The present invention relates to a process whereby site maintenance and repair information is captured on site at telecommunication industry installations as the repair or maintenance is performed and a closeout package for the work is created in near real time.

2. Description of the Related Art

In the telecommunication industry, a service technician generally is servicing equipment at installations that are remote from the office. A service-level agreement or SLA is an expectation, agreement or contract between a network operator and a services firm or company that specifies, usually in measurable terms, what services the network operator can expect and in what time frame.

The current practice is fundamentally a manual process of diagnosing, auditing, and remediating subsequent to which the technician may consume hours or days to complete a "close-out package" which is then transmitted to the network operator or customer. The technician goes through a manual process of, collecting, and assembling information in written form or on a PC and correlating photos with text based comments and remediation steps. Typically this information is then reviewed, edited, and/or corrected by another person who is usually a highly paid engineer.

One problem with the existing practice is that there is a significant delay in the creation of a closeout package. Current SLA's are up to 5 days.

Another problem with the existing practice is overall quality control of this process. Errors in correlating remediation steps, with textual descriptions and photographs are common and extremely costly to the network operators, both directly and in terms of delays.

Another problem with the existing practice is that closeout packages are routed via email. These are typically large documents that are slow to send.

Still a further problem with the existing practice is it is challenging to have a complete historical record of the site activity.

Further problems with the existing practice are created by generating the closeout package off-site from where the work was performed. This may involve discovering that the photos that were taken by the technician are out of focus or missing. This may then require the technician to make a return trip to the work site to take additional photos that fill in the gap created by the out of focus or missing photos in order to enable the closeout package to be completed.

Still a further problem with the existing practice is that the engineer that is reviewing the technician's photos and notes may have difficulty associating the correct photo with the item being worked on at the work site.

Another problem with the existing practice is that reports are inconsistent from one technician to another, the quality of reports are inconsistent and of lower quality.

Because the field technician who is performing the work on-site and the engineer or technician that is preparing the close out report are not communicating with each other in real time, more human intervention is needed. This leads to more errors, more frustration for the workers, and more redoing of work in order to complete the process.

A final problem with the existing practice is the engineers or technicians that are doing the post site work in order to "complete" the close out process based on the information provided by the field technicians are highly paid employees and due to confusing or incomplete information received from the field technicians, they are spending more time in closing out the work than is necessary, making the entire process expensive.

The present process addresses all of these problems by providing real time interaction and information transfer between the field technician and the off-site engineer or technician who will be able to complete the close out process in near real time. This process eliminates the need to revisit work sites to obtain additional photos, more effectively uses the time of engineers and technicians and allows the close out process to be made in near real time, thereby greatly shortening cycle time and reducing the overall cost of the process.

SUMMARY OF THE INVENTION

The present invention is a process and system that leverages the strengths of an on-site technician and a call center. The technicians are good at working the on-site items, identifying technical issues, and resolving those issues while the call center personnel are good at writing, spelling, and verification of data supplied via the real time voice and data connection.

The process facilitates and enables institutional learning and knowledge creation and retention.

One key aspect of the invention is real time voice and data communication to a call center via a smart phone or other web enabled devices and applications.

Another aspect is use of a high resolution camera to document on-site issues and resolutions via photos including time/date stamp and embedded GPS information.

Still a further aspect is automatic transmission of each photo, in real time, to a cloud based image storage system that is accessible to call center personnel. This enables the call center personnel to evaluate the photos for quality in real time and link the photos to the work item as the on-site technician goes through a list of work items common with the call center personnel and the call center personnel document the verbal comments being reported by the on-site technician.

Another aspect of the invention is real time dialogue between the field technician and the call center personnel that can help to clarify issues found and to provide additional information for the closeout reports. Depending on the work being performed on-site the data collection structure can be dynamically adjusted to add reporting items as needed. Photos can be associated with each item and the live voice connection allows for dialogue to clarify the technician's evaluation and observations.

Upon completion of the on-site work the on-site technician signs out with the call center personnel. Some general information is collected and documented by the call center personnel regarding aspects of the on-site work i.e. crew members, time spent on-site, general conditions of the site, etc. After the field technician signs out with the call center the call center personnel trigger the auto-generation of a closeout package for the customer that fully documents the findings at the site with written explanations and photos. That auto-generated report is then immediately available to the customer.

BRIEF DESCRIPTION OF THE DRAWINGS

FIG. 1 is a diagram of a process for capturing site services, maintenance and repair information and creating a closeout package in near real time according to the present invention.

DETAILED DESCRIPTION OF THE PREFERRED EMBODIMENT

The present invention is a process 10 and system that leverages the strengths of an on-site technician 12 and call center personnel 14. The on-site technicians 12 are good at working the on-site items, identifying technical issues, and resolving those issues while the call center personnel 14 are good at writing, spelling, and verification of data supplied via the real time voice and data connection. The process 10 facilitates and enables institutional learning and knowledge creation and retention.

Referring now to the drawing, there is a diagram of a process 10 for capturing site services, maintenance and repair information and creating a closeout package in near real time according to a preferred embodiment of the present invention.

As shown in the diagram, an on-site technician 12 who is working at a remote work site will be equipped with a smart phone 16 that is equipped with Wi-Fi connected Hotspot and an integrated high resolution camera with time/date and GPS stamp. The smart phone 16 will be able to automatically transmit photographic images to the cloud 18 where they will be stored. The smart phone 16 will be provided with hands free voice connection.

The smart phone 16 will allow the on-site technician 12 to communicate in real time with voice and data communication with a call center 20 manned by the call center personnel 14 who are engineers or skilled data center technicians 14. The call center personnel 14 will often have a common list of work items to refer to as the on-site technician 12 performs the work. The call center personnel 14 will prepare the close out package for the work performed by the on-site technician 12 via a call center PC 22 that is attached to a server.

Photos taken by the on-site technician 12 that are automatically transferred to the cloud 18 will be accessible in real time to the call center personnel 14 to review and enter into the call center computer 22 that is attached to the central server.

As the work is being done by the on-site technician 12, the call center personnel 14 will be recording information received from the on-site technician 12 directly via voice and data communication and recording photographs received via the cloud 18 and will be entering this information, data, and photos into the call center computer system server in real time to create a report on the work being performed.

The call center personnel 14 will be using a dual screen personal computer 22 that communicates with the server. The personal computer 22 is provided with a headset 24 for voice communication with the on-site technician 12 and the computer 22 provides access to photos taken by the on-site technician 12 and stored in the cloud image storage 18. The PC 22 will also be able to access software for collecting and processing voice and image data and automatically generating a customer closeout package.

The process 10 involves the on-site technician 12 calling into the call center 20 and establishing voice communication with the call center personnel 14. Then the call center personnel 14 connect to the cloud 18 to access photos common with the on-site technician 12. Next, the on-site technician 12 performs diagnostic and remediation steps or actions. The on-site technician 12 verbally describes to the call center personnel 14 each step or action as it is done and the call center personnel 14 records the information in their PC 22 which in turn communicates with a central server. The on-site technician 12 takes photos of key items being described and the call center personnel 14 associate the photos taken with the item descriptions and record this data and photos on the server with their PC 22. Upon completing the on-site work, the on-site technician 12 signs out with the call center personnel 14. Some general information is collected and documented by the call center personnel 14 regarding aspects of the on-site work such as crew members, time spent on site, general conditions of the site, etc. Then the call center personnel 14 closes out the data collection and this triggers the auto-generation by the server of a closeout package for the customer that fully documents the findings at the site with written explanations, data, and photos. That auto-generated closeout package is then immediately available to the customer via web access.

One key aspect of the invention is real time voice and data communication to a call center 20 via a smart phone 16 or other web enabled devices and applications.

Another aspect is use of a high resolution camera 16 to document on-site issues and resolutions via photos and including time/date stamp and embedded GPS information.

Still a further aspect is automatic transmission of each photo, in real time, to a cloud based image storage system 18 that is accessible to call center personnel 14. This enables the call center personnel 14 to evaluate the photos for quality in real time and link the photos to the work item as the on-site technician 12 goes through a list of work items common with the call center personnel 14 and the call center personnel 14 document the verbal comments being reported by the on-site technician 12 as he performs the work items.

Another aspect of the invention is real time dialogue between the on-site field technician 12 and the call center personnel 14 that helps to clarify issues found and to provide additional information for the closeout reports. Depending on the work being performed on-site, the data collection structure can be dynamically adjusted to add reporting items as needed. Photos can be associated with each item and the live voice connection allows for dialogue to clarify the technician's evaluation and observations.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A process for capturing site maintenance and repair information and creating a closeout package in near real time comprising:
   an on-site technician establishing via a web enabled device real time voice communication with call center personnel located in a call center,
   the call center personnel connecting to a cloud based image storage system to access in real time photos common with the on-site technician, the on-site technician going through a predetermined list of items or skill based diagnostic and remediation steps or actions as the technician is verbally describing to the call center personnel each item as it is done, the call center personnel recording information received verbally from the on-site technician in a call center computer, the on-site technician taking photos of key items being described and sending them to the cloud based image storage system, the call center personnel accessing the photos from a cloud based image storage system and associating the photos taken with the item descriptions recorded in the computer, the on-site technician signing out with the call center personnel upon completing the on-site work, the call center personnel collecting and documenting general information regarding aspects of the on-site work in the computer before closing out the data collection in the computer, and the call center personnel closing out the data collection in the computer which triggers the computer to automatically generate a closeout package containing the findings at the site with written explanations, data and photos and to make the closeout package immediately available to the customer via web access.

2. A process for capturing site maintenance and repair information and creating a closeout package in near real time according to claim 1 further comprising the following step that is performed after the on-site technician establishes voice communication with call center personnel and before the on-site technician signs out:

the call center personnel interacting verbally in real time with the on-site technician to clarify issues, to provide additional information for the closeout reports, and to adequately document the steps or actions of the technician as the work is being performed.

3. A system for capturing site maintenance and repair information and creating a closeout package in near real time comprising:

an on-site technician using a web enabled device that establishes real time voice and data communication between the technician and call center personnel regarding an on-site job, a computer accessible to the call center personnel for recording information as the technician describes actions taken on a predetermined list of items or skill based diagnostic and remediation steps or actions as the actions are being taken on-site, a cloud based image storage system accessible by both the on-site technician and the call center personnel to allow photos taken by the technician to be reviewed in real time by the call center personnel and associated with the information recorded in the computer regarding item descriptions, and the computer provided with a program that automatically generates a closeout package for the job which is immediately available to the customer via web access upon the call center personnel closing out data collection on the job.

4. A system for capturing site maintenance and repair information and creating a closeout package in near real time according to claim 3 wherein the web enabled device includes a high resolution camera to document on-site issues and resolutions via photos including time/date stamp and embedded GPS information.

5. A system for capturing site maintenance and repair information and creating a closeout package in near real time according to claim 3 wherein the web enabled device is a smart phone that is equipped with Wi-Fi connected Hotspot and an integrated high resolution camera with time/date stamp and embedded GPS information.

6. A system for capturing site maintenance and repair information and creating a closeout package in near real time according to claim 3 wherein the smart phone is provided with hands free voice connection.

* * * * *